US010885187B1

(12) United States Patent
Djerbaka (10) Patent No.: US 10,885,187 B1
(45) Date of Patent: Jan. 5, 2021

(54) VIRUS SCANNING ON STORAGE SYSTEMS COMPRISING MULTIPLE STORAGE SERVERS WITH A PLURALITY OF FILE SYSTEMS

(71) Applicant: EMC IP Holding Company LLC, Hopkinton, MA (US)

(72) Inventor: Paul Djerbaka, Leominster, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 225 days.

(21) Appl. No.: 15/789,443

(22) Filed: Oct. 20, 2017

(51) Int. Cl.
*G06F 21/56* (2013.01)
*G06F 16/182* (2019.01)
*G06F 9/455* (2018.01)

(52) U.S. Cl.
CPC ........ *G06F 21/565* (2013.01); *G06F 9/45558* (2013.01); *G06F 16/183* (2019.01); *G06F 2009/45595* (2013.01); *G06F 2221/034* (2013.01)

(58) Field of Classification Search
CPC .. G06F 21/565; G06F 16/183; G06F 9/45558; G06F 2009/45595; G06F 2221/034
See application file for complete search history.

(56) References Cited

U.S. PATENT DOCUMENTS

| 8,776,235 | B2 | 7/2014 | Coronado et al. | |
|---|---|---|---|---|
| 2002/0194487 | A1* | 12/2002 | Grupe | G06F 21/562 726/22 |
| 2003/0110258 | A1* | 6/2003 | Wolff | H04L 63/145 709/225 |
| 2004/0158730 | A1* | 8/2004 | Sarkar | G06F 21/564 726/24 |
| 2013/0269029 | A1* | 10/2013 | Nakawatase | H04L 63/16 726/22 |

(Continued)

OTHER PUBLICATIONS

Moctar et al., "A survey of security challenges in cloud computing," 2017 International Conference on Wireless Communications, Signal Processing and Networking (WiSPNET) Year: 2017 | Conference Paper | Publisher: IEEE.*

(Continued)

*Primary Examiner* — Roderick Tolentino
(74) *Attorney, Agent, or Firm* — Ryan, Mason & Lewis, LLP (57) ABSTRACT

A storage system includes at least one processing device comprising a processor coupled to a memory, the at least one processing device being configured to determine two or more storage servers accessible to the storage system and to conduct a virus scan by iterating through the two or more storage servers to scan files stored in a plurality of file systems of the two or more storage servers. Iterating through the two or more storage servers comprises selecting one of the storage servers, identifying the file systems provided by the selected storage server, committing the identified file systems to a plurality of antivirus servers coupled to the storage array, scanning files in the committed file systems utilizing the plurality of antivirus servers, and, responsive to completing the scan of files in the committed file systems, selecting another one of the storage servers and repeating the identifying, committing and scanning.

20 Claims, 6 Drawing Sheets

(56) References Cited

U.S. PATENT DOCUMENTS

| | | | | |
|---|---|---|---|---|
| 2014/0074793 A1* | 3/2014 | Doering | ................ | G06F 16/182 |
| | | | | 707/667 |
| 2014/0337981 A1* | 11/2014 | Wade | .................... | G06F 21/566 |
| | | | | 726/24 |
| 2015/0331905 A1* | 11/2015 | Brand | ................ | G06F 16/2453 |
| | | | | 707/770 |
| 2016/0294847 A1* | 10/2016 | Coronado | ............... | G06F 16/23 |
| 2018/0276381 A1* | 9/2018 | Beals | .................... | G06F 21/552 |

OTHER PUBLICATIONS

Jaiswal et al., "A Survey on Contemporary Security Threats in Big Data and Information System," 2017 Second International Conference on Recent Trends and Challenges in Computational Models (ICRTCCM).*

* cited by examiner

VIRUS SCANNING ON STORAGE SYSTEMS COMPRISING MULTIPLE STORAGE SERVERS WITH A PLURALITY OF FILE SYSTEMS

FIELD

The field relates generally to information security, and more particularly to detection of security threats in computer networks.

BACKGROUND

Various entities are subject to different types of security threats. Some security threats relate to networking and computer security for client devices used by members of an entity, such as a business, organization or other enterprise. Security threats of this type include viruses and other types of malware. Viruses and malware can pose threats to an individual user and that user's devices, as well as possibly threatening an entity associated with the user. If a virus or other type of malware is stored on network attached storage (NAS) or another shared storage associated with an entity or enterprise, the virus or malware can lead to infections for various users and user devices, resulting in lost time and productivity, loss of data, etc.

SUMMARY

Illustrative embodiments of the present invention provide techniques for proactive virus elimination on enterprise class storage systems such as storage arrays including multiple storage servers having a plurality of file systems.

In one embodiment, a storage system comprises at least one processing device comprising a processor coupled to a memory, the at least one processing device being configured to determine two or more storage servers accessible to the storage system and to conduct a virus scan by iterating through the two or more storage servers to scan files stored in a plurality of file systems of the two or more storage servers. Iterating through the two or more storage servers comprises selecting one of the storage servers, identifying the file systems provided by the selected storage server, committing the identified file systems to a plurality of antivirus servers coupled to the storage array, scanning files in the committed file systems utilizing the plurality of antivirus servers, and, responsive to completing the scan of files in the committed file systems, selecting another one of the storage servers and repeating the identifying, committing and scanning.

In another embodiment, a method comprises determining two or more storage servers accessible to a storage system and conducting a virus scan by iterating through the two or more storage servers to scan files stored in a plurality of file systems of the two or more storage servers. Iterating through the two or more storage servers comprises selecting one of the storage servers, identifying the file systems provided by the selected storage server, committing the identified file systems to a plurality of antivirus servers coupled to the storage array, scanning files in the committed file systems utilizing the plurality of antivirus servers, and, responsive to completing the scan of files in the committed file systems, selecting another one of the storage servers and repeating the identifying, committing and scanning.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Proactive virus and malware elimination is an important task for various entities. For example, the cost of a virus infection in the computer network of an entity may range from lost time and productivity in remedying the infection through irretrievable loss of data or permanent damage to devices or other hardware. Virus and malware detection and remediation presents significant challenges for enterprise class storage, which may comprise a storage array or storage arrays (e.g., a number of network-accessible worldwide storage arrays) with multiple storage servers implementing a plurality of file systems.

Malicious software, or malware, is software used to disrupt computer operations, gather sensitive information, or gain access to private computer systems. A computer virus is a type of malware that, when executed, replicates by inserting copies of itself into computer programs, data files, or the hard drive or other storage of a computer. Antivirus software can be installed in a system to detect and eliminate known viruses when a computer in the system attempts to download or run an infected program.

When a network client accesses a file in a network file server, the network file server may invoke a virus checker or virus scanning program to perform an antivirus scan. Industry standard virus checkers, such as those available from McAfee®, are typically implemented as "front end" graphical user interface (GUI)-based virus scanners on a Windows NT file server. Antivirus scanning in such front end systems check files on storage arrays "On-Access" (e.g., only when files are written). Thus, front end antivirus scanning is dependent on the performance of the antivirus software, which is constrained by the memory, central processing unit (CPU) and other resources of the Windows NT file server running the front end virus scanning system. Front end antivirus scanning is further dependent on the number, type and size of files to be checked. Scanning container files, such as .zip and .rar archive files, may require such files to be unpacked. Database (DB) files, such as .pst and .mdb files, are also typically large and take considerable time to completely scan.

Front end virus scanning thus suffers from various disadvantages. A general challenge is in how to handle large numbers of On-Access scan requests from a storage server or storage array in a timely manner utilizing a front end Windows NT server implementing virus scanning software. Front end initiated virus checks or scans are dependent on available client-side (e.g., Windows) resources, and could take significant time (e.g., weeks) to complete a full antivirus scan of a single storage array. Further, On-Access checking used in front end virus scanning may scan only a small percentage of the files on the storage arrays (e.g., less than 5% of all files stored in the storage arrays). Over time, millions of files may be accumulated and stored in storage arrays through data migrations, consolidations, etc. Since On-Access virus scanning only checks files when they are written, a large number of files stored in storage arrays may be left unchecked for latent viruses or other malware.

On-Access virus scanning may utilize Common Event Enabler (CEE) Common Antivirus Agent (CAVA) solutions for clients running server message block (SMB) protocol only. If clients use network file system (NFS) or file transfer protocol (FTP) protocols to move or modify files on storage arrays, CEE CAVA solutions do not scan such files for viruses or malware.

In some embodiments, methods are initiated by a storage control station of a storage array to initiate a virus scan process on an entire range of in-scope file systems on a storage array or on a number (e.g., N) of network accessible world-wide storage arrays. Such virus scanning processes may provide for automated initiation and log collection from one or many (e.g., 1-N) unified hybrid flash storage arrays, such as VNX® storage arrays commercially available from Dell EMC. Such methods may be viewed as "back end" and are applicable to global mission critical enterprise class environments. Back end virus scanning can be two orders of magnitude (e.g., ×100) times more efficient than "front end" GUI-based virus scanning implementations.

Some embodiments provide solutions which are client and operating system agnostic, and do not depend on or require any specific external client software for initialization or implementation. Custom developed scripts may be configured to run on the control station of a storage array to complete automated or on-demand scans of all file systems in a storage array or group of storage arrays or storage servers. The script is thus considered as a scan from a back end, as compared with conventional front end approaches described above that are initiated through software user interfaces. Advantages of back end scanning include, for example, that back end scanning does not require the overhead and network contention that synchronous client-side initiation used in front end approaches entail. Back end scanning, in some embodiments, provides improvements of two orders of magnitude efficiency relative to front end scanning.

Tests show that in real-world implementations (e.g., where millions or billions of files are stored in thousands of different file systems on hundreds of storage servers), it can take hundreds of days to complete a front end scan of all files stored in a storage array or network of in-scope storage arrays. Attempting to check or scan such large numbers of files with industry standard (e.g., McAfee®) front end virus scanning programs proves prohibitive, as a single file system may take many days to complete the scan. In real-world implementations having thousands of file systems on hundreds of storage servers, it is thus not practical to perform front end virus scanning.

Back end virus scanning solutions utilized in some embodiments provide orders of magnitude efficiency improvements relative to front end virus scanning. For example, in a group of storage arrays with 150 storage servers, over 36,000 file systems and nearly 1.7 billion files, a back end virus scan can be completed in less than 24 hours. Further, back end solutions scale well thus enabling scale-out proactive virus elimination on enterprise class storage. Back end scanning may also be used for storage servers or storage arrays which are distributed throughout the world, using different types of file systems.

An information technology (IT) production system may include hundreds of storage servers worldwide, with thousands of file systems and billions of files. Many of the files are left unchecked for potential viruses by front end scanning approaches. For example, thousands of files may be copied to shared storage daily. Front end scanning approaches which check only limited types of files with On-Access scanning methods leave many or most files on a storage array unchecked. Over time, large numbers (e.g., millions or billions) of files may be accumulated on storage servers through data migrations and consolidations, with many of such files left unchecked for latent viruses.

Figure 1:
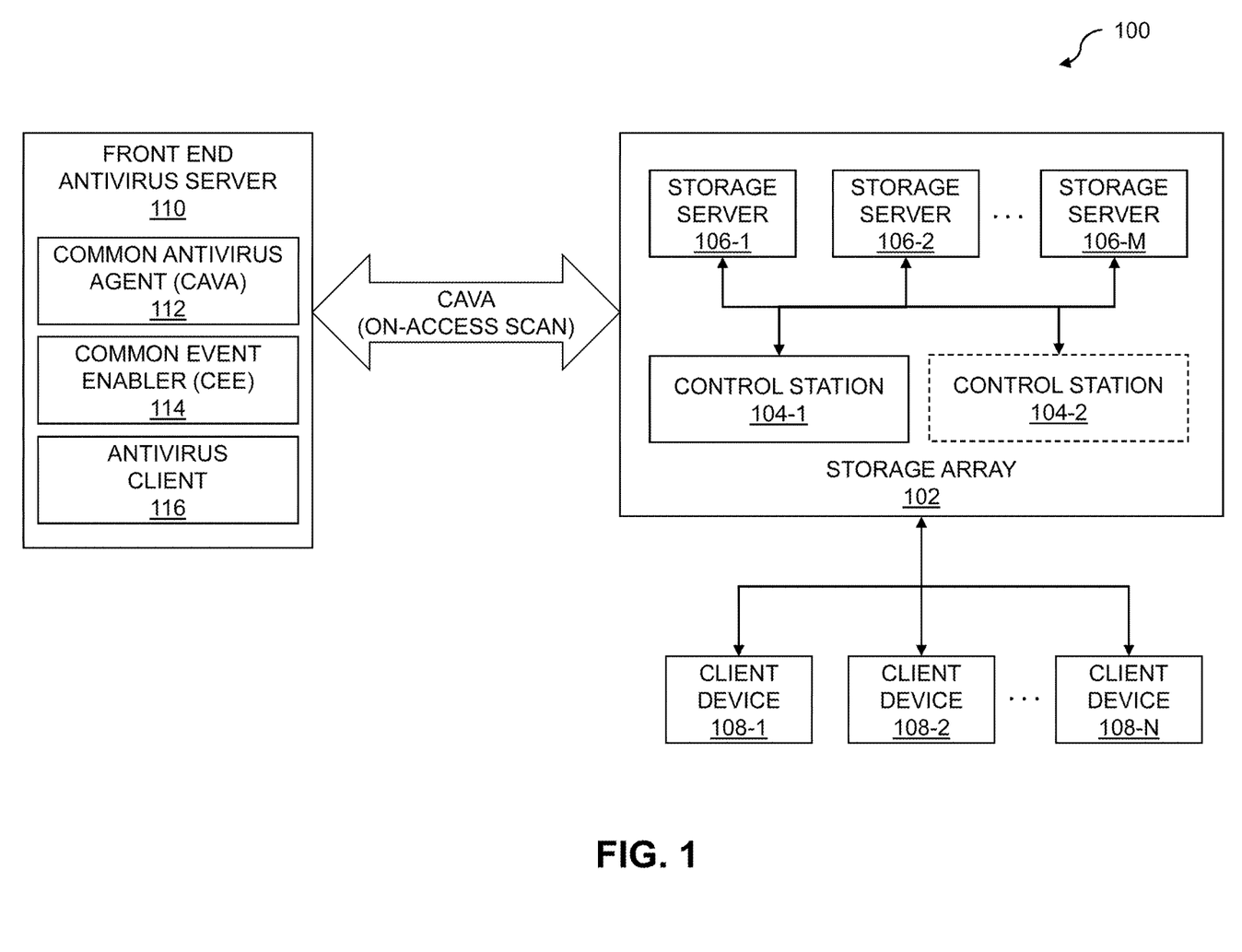
FIG. 1 is a block diagram of an information processing system for front end virus scanning of a storage array in an illustrative embodiment.

FIG. 1 shows an information processing system 100 configured for front end virus scanning. The information processing system 100 includes a storage array 102, which has control stations 104-1 and 104-2 (collectively, control stations 104) and storage servers 106-1, 106-2, . . . , 106-M (collectively, storage servers 106). Multiple control stations 104 allow for redundancy in the case of failure of one of the control stations 104. In the FIG. 1 example, the control station 104-2 is configured as a back-up for control station 104-1, and thus the control station 104-2 is shown in dashed outline. A storage array, however, need not implement multiple control stations. Further, a storage array may include more than two control stations if desired. Further, it is noted that a storage array is an example of what is more generally referred to herein as a storage system. A storage system may comprise one or multiple storage arrays and/or other types of storage products.

Client devices 108-1, 108-2, . . . , 108-N (collectively, client devices 108) are coupled to the storage array 102, possibly via one or more networks not explicitly shown in FIG. 1, for accessing file systems of the storage array 102 on storage servers 106. For example, one or more of the storage servers 106 of the storage array 102 may implement a Common Internet File System (CIFS) network share (e.g., such as a CIFS share accessible via a path \\CIFSServer\Share). The client devices 108 can read and write files to network shares provided by the storage array 102.

The client devices 108 may comprise, for example, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers."

The client devices 108 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing devices are possible, as will be appreciated by those skilled in the art.

As mentioned above, the client devices 108 may be coupled to the storage array 102 over one or more networks. In some embodiments, such networks comprise a global computer network such as the Internet, although other types of networks can be used, including a wide area network (WAN), a local area network (LAN), a satellite network, a telephone or cable network, a cellular network, a wireless network such as a WiFi or WiMAX network, or various portions or combinations of these and other types of networks.

The storage servers 106, although shown as internal to the storage array 102, may instead be coupled to or connected to the storage array 102 via one or more networks which may be the same as or different from networks connecting the client devices 108 to the storage array 102. Further, while only a single storage array 102 is shown in FIG. 1 for clarity of illustration, it is to be appreciated that client devices 108 may access multiple different storage arrays, which may be interconnected with one another in a storage area network (SAN) or other type of networked arrangement. In some cases, two or more distinct storage arrays may collectively form one or more network shares accessible to the client devices 108.

In some embodiments, the storage array 102 and/or storage servers 106 may be implemented using storage products such as VNX® and Symmetrix VMAX® storage arrays, software-defined storage products such as ScaleIO™ and ViPR®, flash-based storage arrays such as Unity, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC. A variety of other storage products may be utilized to implement at least a portion of the storage array 102 or storage servers 106 forming the storage array, including network attached storage (NAS) products such as Celerra® devices which may be standalone or implemented within a storage array such as VNX®, CLARiiON® or Symmetrix® storage arrays from Dell EMC. In the discussion below, it is assumed that the storage array 102 is implemented as a VNX® storage array with the storage servers 106 being implemented as respective Celerra® devices. It is to be appreciated, however, that various other types of storage arrays and storage servers or storage devices may be used in other embodiments.

In the storage array 102, each of the storage servers 106 may implement a respective physical Data Mover. A Data Mover is a component that runs its own operating system (OS), which retrieves data from a storage device and makes it available to a network client (e.g., client devices 108). Data Movers may utilize various protocols, such as NFS and CIFS protocols. The storage array 102 may also implement virtual data movers (VDMs), which are software features enabling the grouping of CIFS and/or NFS environments and servers into virtual containers. CIFS and/or NFS environments on one or multiple ones of the storage servers 106 may be grouped as a VDM.

The system 100 further comprises a front end antivirus (AV) server 110, which implements a CAVA agent 112, a CEE 114 and an AV client 116. The AV server 110 is a Windows system running the CEE 114 and antivirus software (e.g., from McAfee®, Symantec®, etc.) as AV client 116. CAVA On-Access scanning is provided by Data Movers or storage servers 106 providing files that are written by client devices 108 to the CAVA agent 112 of AV server 110, which in turn provides the files to the AV client 116 for scanning. Such front end approaches, as mentioned above, are slow and involve significant overhead in addition to scanning only a small fraction (e.g., less than 5%) of all files stored on the storage servers 106 of storage array 102 via On-Access scanning methods.

Figure 2:
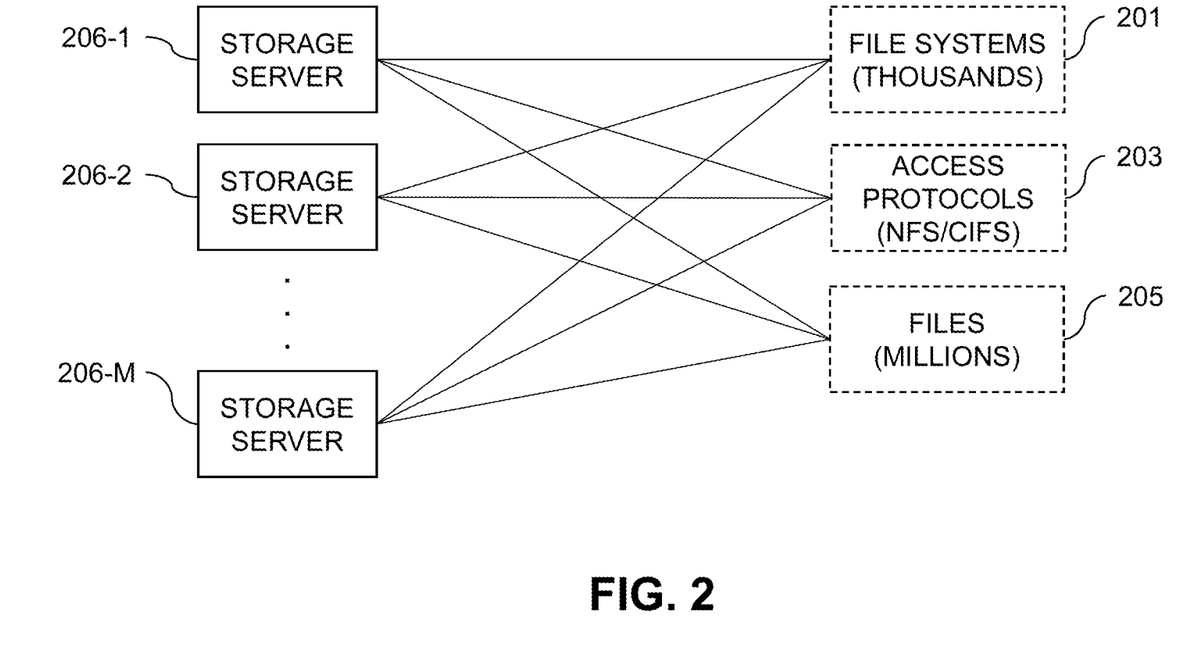
FIG. 2 is a block diagram illustrating storage servers and associated file systems, access protocols and files in an illustrative embodiment.

Attempting to check large numbers of files (e.g., millions or billions of files) with front end approaches proves prohibitive, as a scan of a single file system may take days to complete utilizing a front end AV server such as front end AV server 110. For example, with 36,000 file systems scanned at a rate of one per day, front end scanning would take 100 years. FIG. 2 illustrates the scope of real-world enterprise class storage, where a group of storage servers or Data Movers 206-1, 206-2, . . . , 206-M (collectively, storage servers 206) collectively implement thousands of file systems 201, with multiple access protocols 203 (e.g., NFS, CIFS, etc.) and millions or billions of files 205. In some embodiments, the number M of storage servers 206 is over 100, such as an enterprise class storage solution with 150 storage servers.

Embodiments provide techniques which allow for automating a periodic (e.g., weekly) or on-demand virus scan of all in-scope storage arrays of a worldwide enterprise. This involves scanning files accumulated over years of data migrations and consolidations as well as net new files. Custom developed scripts are executed on control stations of a storage array or storage arrays to provide such automated or on-demand virus scanning. Each storage array, or possibly each storage server, can implement an AV agent via command line interfaces (CLIs) without the overhead of a GUI used in front end scanning approaches. Each storage array or each storage server can connect to multiple AV servers (e.g., 5 AV servers), possibly using CAVA, to provide for back end scanning of all files stored in the storage arrays or storage servers. A one-to-many approach is used to connect a storage array or storage server with a group of AV servers via dedicated high-speed connections, such as dedicated gigabit connections between a storage array or storage server and each of a group of two or more AV servers.

Figure 3:
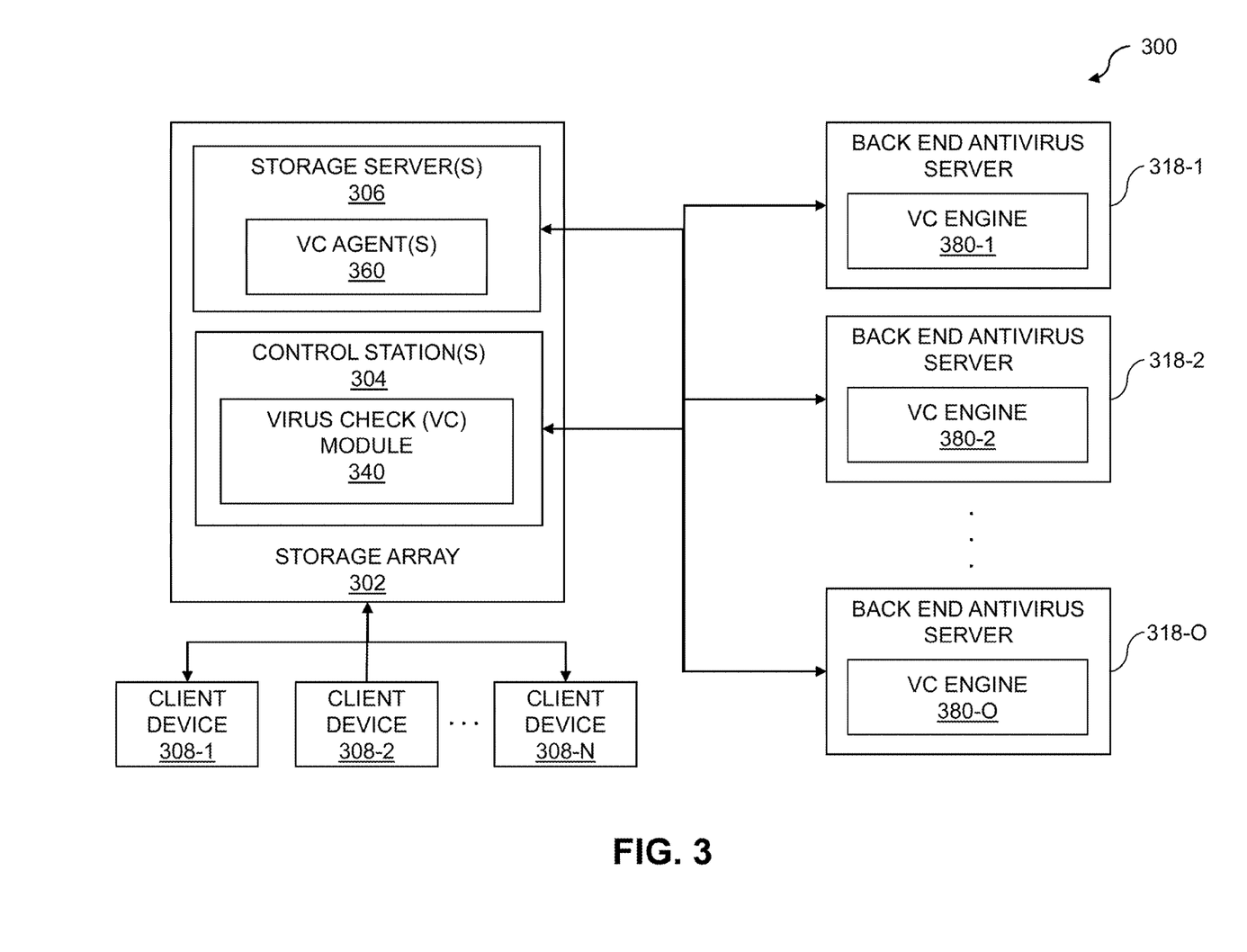
FIG. 3 is a block diagram of an information processing system for back end virus scanning of a storage array in an illustrative embodiment.

FIG. 3 shows an information processing system 300 configured for back end scanning. The information processing system 300 includes a storage array 302, with control station(s) 304. While FIG. 3 shows only a single control station 304 for clarity, it is to be appreciated that multiple control stations 304 may be used for redundancy in a manner similar to that described above with respect to the control stations 104 of storage array 102. The storage array 302 further includes a number of storage servers 306. Again, while FIG. 3 shows only a single storage server 306 for clarity, it is to be appreciated that the storage array 302 may include or be coupled or otherwise connected to two or more storage servers 306 in a manner similar to that described above with respect to the storage servers 106 of storage array 102.

Client devices 308-1, 308-2, . . . , 308-N (collectively, client devices 308) are coupled to the storage array 302, possibly via one or more networks not explicitly shown, in a manner similar to that described above with respect to the client devices 108 of system 100.

In the system 300, the control station 304 of the storage array 302 is configured with a VC module 340. The VC module 340, via VC agents 360 running on storage servers 306, is configured to implement back end virus scanning of the files stored in the storage servers 306 of storage array 302 utilizing a set of back end AV servers 318-1, 318-2, . . . , 318-0 (collectively, back end AV servers 318) implementing respective VC engines 380-1, 380-2, . . . , 318-0 (collectively, VC engines 380). Although not explicitly shown in FIG. 3, the back end AV servers 318 may have respective dedicated physical connections (e.g., gigabit links) to the storage array 302 to facilitate back end scanning of files on the storage servers 306.

The back end AV servers 318 may utilize a secure shell (SSH) protocol to access the storage array 302 and files stored in the storage servers 306, via dedicated physical connections, network connections, etc. The SSH protocol is advantageously configured for multiprotocol (MP) access, such that the back end AV servers 318 may be configured to access files stored in the storage servers 306 of storage array 302 which utilize different types of file systems (e.g., configured for access using both NFS and CIFS protocols). Using MP file system access, the back end AV servers 318 can thus scan regardless of the type of shares (e.g., the back end AV servers 318 can scan Windows shares, Unix or Linux shares, etc.).

Similar to the storage array 102, the storage array 302 may be implemented using various type of storage products. Further, while only one storage array 302 is shown in FIG. 3 for clarity of illustration, it is to be appreciated that multiple storage arrays may connect to a group of back end AV servers 318, possibly with different ones of the storage arrays connecting to distinct subsets of a plurality of AV servers 318.

The VC engines 380 of back end AV servers 318 are configured to implement VC software that performs scans on files from the storage servers 306 of storage array 302. The VC agents 360 running on the storage servers 306, under control of the VC module 340 implemented by control station 304 of the storage array 302, utilize CLIs for moving files from the storage servers 306 to respective ones of the back end AV servers 318 as will be described in further detail below with respect to FIG. 4.

The control station 304 of storage array 302 is assumed to be implemented using at least one processing device. Each such processing device generally comprises at least one processor and an associated memory, and implements one or more functional modules for controlling certain features for back end virus scanning as described herein. In the FIG. 3 embodiment, for example, the control station 304 implements a VC module 340 which in turn coordinates or controls VC agents 360 running on storage servers 306.

At least portions of the VC module 340 and VC agents 360 may be implemented at least in part in the form of software that is stored in memory and executed by a processor. For example, the control station 304 may run a Linux OS, with the VC module 340 being implemented as a shell script (e.g., a Bash shell script). In some embodiments, back end scanning utilizing the back end AV servers 318 may be implemented via a Crontab entry on control station 304 configured to initiate proactive virus checking cleanup scripts on a periodic basis (e.g., daily, weekly, monthly, etc.). In some embodiments, such scripts are scheduled to run during off-peak hours, such as on the weekend. Thus, embodiments permit proactive identification and elimination of dormant viruses and other malware on storage arrays. With viruses and other malware identified and quarantined periodically with automated scans that do not require user intervention, critical shared files can be kept safe and virus free.

It is to be understood that the particular set of elements shown in FIG. 3 for back end virus scanning is presented by way of illustrative example only, and in other embodiments additional or alternative elements may be used. Thus, another embodiment may include additional or alternative systems, devices and other network entities, as well as different arrangements of modules and other components.

By way of example, in other embodiments, the storage array 302 may be connected to a number of additional storage servers external to the storage array 302, in place of or in addition to one or more storage servers 306 implemented internal to the storage array 302. As another example, multiple distinct storage arrays may each implement a VC module or VC agents for connection to one or more of the back end AV servers 318. The control station 304, storage array 302, back end AV servers 318 and other portions of the system 300, as will be described in further detail below, may be implemented at least in part using one or more processing platforms including public or private cloud infrastructure, or other distributed virtual infrastructure.

The storage array 302, as discussed above, comprises one or more control stations 304. The control stations 304 may be implemented using processing devices as described herein. The control stations 304, using VC module 340, are configured to determine the storage servers 306 that are accessible to the storage array 302, and to conduct a virus scan by iterating through the storage servers 306 to scan files stored in a plurality of file systems of the storage servers 306.

In some embodiments, iterating through the storage servers 306 comprises selecting one of the storage servers 306, identifying file systems provided by the selected storage server, committing the identified file systems to back end AV servers 318 that are coupled to the storage array 302, scanning the files in the committed file systems utilizing the VC engines 380 of the back end AV servers 318 and, responsive to completing the scan of files in the committed file systems, to select another one of the storage servers 306 and repeat the process of identifying, committing and scanning.

Scanning the file systems in the committed file systems utilizing the VC engines 380 of the back end AV servers 318 may comprise accessing files in the committed file systems using one or more CLIs, possibly via VC agents 360 implemented on respective ones of the storage servers 306. In some embodiments, a MP interface is utilized to access the files in the committed file systems. Each of the storage servers 306 may have file systems of different types, and thus may provide different types of interfaces for accessing such different types of file systems. A MP interface may be utilized, such as a MP interface with NFS and CIFS interfaces, for accessing the files in such storage servers. A SSH CLI is an example of such a MP interface.

In some embodiments, scanning the files stored in the plurality of file systems of the storage servers 306 includes scanning all files on the storage servers 306, rather than only scanning files On-Access as with front end scanning approaches discussed above. The control station 304 may conduct the virus scan of the file systems of storage servers 306 by invoking a script file that is stored locally in the memory of the control station 304. The script file may comprise a configuration of designated types of files to scan or to exclude from scanning in the committed file systems. The script file may comprise a shell script, such as a Bash shell script. The virus scan may be conducted on-demand by invoking the script file stored in the control station 304 (e.g., by a user of one of the client devices 308 with sufficient access permissions invoking the script file). The virus scan may also or alternatively be conducted periodically, such as by using a time-based job scheduler implemented by the control station 304 that invokes the script file. The time-based job scheduler may be a Cron job scheduler if the control station 304 runs a Linux OS.

Scanning the files in the committed file systems may involve, responsive to detecting a malicious file (e.g., a virus or other malware) stored in a given file system, quarantining or taking other remedial action and updating a log to indicate detection of the malicious file. Examples of remedial action which may be taken in addition to or as an alternative to quarantining a malicious file include: deleting the file, generating an alert or notification for delivery to a designated user such as a system or network administrator, etc. After completing a scan of the files in the committed file systems of a currently selected one of the storage servers 306, the log may be written to memory of the control station 304 or to one or more of the storage servers 306. An exemplary process for back end virus scanning will now be described in more detail with reference to the flow diagram of FIG. 4. It is to be understood that this particular process is only an example, and that additional or alternative processes for back end virus scanning can be carried out in other embodiments.

Figure 4:
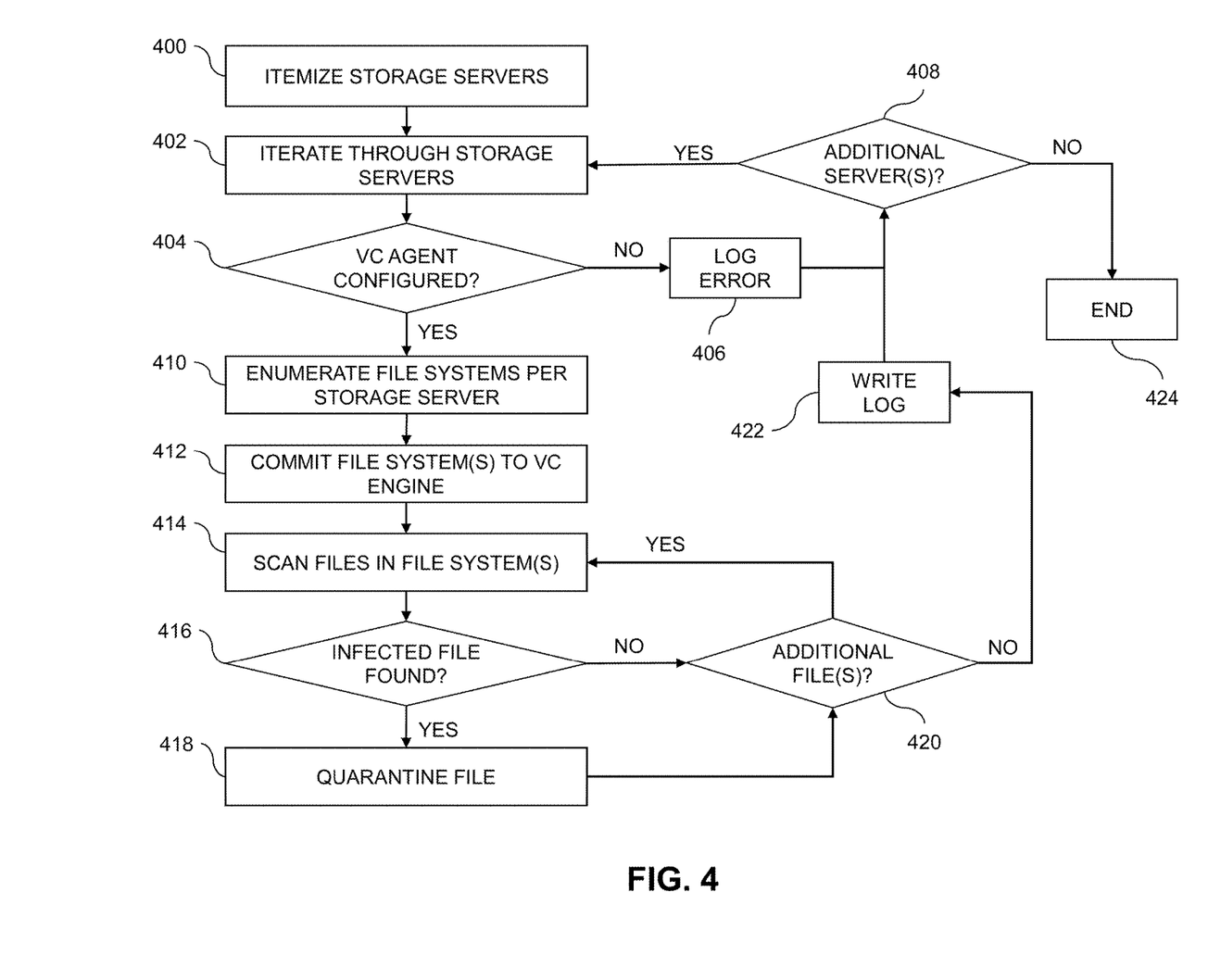
FIG. 4 is a flow diagram of a process for back end virus scanning of a storage array in an illustrative embodiment.

In this embodiment, the process includes steps 400 through 424. These steps are assumed to be performed by the control station 304 and back end AV servers 318 utilizing VC module 340, VC agents 360 and VC engines 380. The process begins with step 400, itemizing storage servers of a storage array that are to be scanned. In some embodiments, step 400 further includes various initialization procedures of a virus scanning script. In the description below, various examples of pseudocode which may be utilized to implement certain commands or functionality of a virus scanning or virus checker script are presented. It is to be appreciated, however, that the pseudocode of such commands is presented by way of example only, and that embodiments are not limited to use with the particular pseudocode given.

The following command may be used in an initialization procedure to start CIFS threads on storage servers:

server_cifs server_ where "server_" in this instance is a general term, which may be replaced with an identifier of a particular storage server (e.g., server_2, server_3, etc.).

Once CIFS threads (or other threads to initialize file system protocols on storage servers) are running, server file commands (e.g., server_file) may be used to obtain configuration files from the different storage servers or Data Movers that a control station has access to. The server_file command may be implemented as follows:

server_file{<movername>|ALL}{-get|-put}src_file dst_file where the "movername" is replaced with an identifier of a particular storage server and the "get" and "put" parameters refer to retrieving and storing files on the identified storage server. Additional commands may be used to determine whether each storage server has a Celerra Event Publishing Agent (CEPA) configuration file (cepp.conf), which is required in order to run a CAVA service. For example, the following command may be used:

server_file server_-get cepp.conf

Additional commands and logic may be run during initialization to determine whether back end AV servers are in place and running. The following command may be used to check the status of back end AV servers:

server_cepp server_-service-status

In response, the virus checking script will check a list of specified IP addresses or other identifiers to return status information such as:

ONLINE at <date and time>
Server Name: <servername>
Last time signature updated: <date and time>

Each available back end AV server may respond with the above and possibly other status information. Once all requests to the list of specified IP addresses or other identifiers are completed, a completion message may be returned.

To identify the types of files that are to be scanned, the following command may be used:

server_file_server_-get viruschecker.conf which returns lists of masks for file types to be scanned, along with exclusions. Examples of such file type masks and exclusions are:

masks=*.DO?:*.XL?:*.ASD:*.CDR:*.CPT:*.CSV:
 *.D?B:*.DIF:*.DQY:*.GF?:*.GIM
masks=*.GIX:*.GMS:*.GNA:*.GW?:*.ICS:*.IQY:
 *.MPP:*.MPT:*.MSG:*.MSO:*.OLE
masks=*.OTM:*.OUT:*.PDF:*.POT:*.PP?:*.PWZ:
 *.QQY:*.RQY:*.RTF:*.SH?:*.SKV
masks=*.SLK:*.UUU:*.VS?:*.WIZ:*.WBK:*.WP?:
 *.WRI:*.XML:*.{??
masks=*.DL?:*.EX?:*.ACM:*.ADE:*.ADP:*.ADT:
 *.AP?:*.ASA:*.ASD:*.ASP:*.AX?
masks=*.B64:*.BA?:*.BIN:*.BMP:*.BO?:*.BZ?:*.CGI:
 *.CC?:*.CDX:*.CEO:*.CHM
masks=*.CLA:*.CMD:*.CNV:*.CO?:*.CPL:*.CPT:
 *.CPY:*.CRT:*.CSC:*.CSS
masks=*.DAT:*.DEV:*.DOC:*.DOT:*.DRV:*.EE?:
 *.EFV:*.EML:*.FDF:*.FE?:*.FMT
masks=*.FO?:*.FPH:*.FPW:*.GWI:*.HDI:*.HHT:
 *.HLP:*.HT?:*.HWD:*.IM?:*.IN?
masks=*.ION:*.ISP:*.ITS:*.JAR:*.JP?:*.JS?:*.LGP:
 *.LNK:*.LWP:*.LIB:*.LUA
masks=*.M3U:*.MBR:*.MB0:*.MB1:*.MB2:*.MD?:
 *.MHT:*.MOD:*.MPD:*.MRC:*.MS?
masks=*.NEW:*.NWS:*.OB?:*.CO?:*.OD?:*.OL?:
 *.OUT:*.OV?:*.PCD:*.PCI:*.PD?
masks=*.PF?:*.PHP:*.PI?:*.PL?:*.PNG:*.PRC:*.QLB:
 *.QPW:*.QTC:*.RAR:*.REG
masks=*.RMF:*.RTF:*.SCR:*.SCT:*.SH?:*.SIS:
 *.SMM:*.SPL:*.SRF:*.SX?:*.SYS
masks=*.SWF:*.TFT:*.TLB:*.TSP:*.VBS:*.VB?:
 *.VVV:*.VWP:*.VXD:*.URL:*.UNP
masks=*.WIZ:*.WMF:*.WMP:*.WMV:*.WP?:*.WRL:
 *.WRZ:*.WS?:*.X32:*.XML:*.XRF
masks=*.XSL:*.XTP:*.XX?:*.ZI?:*.Z0M:*.ZL?:*.ZZZ:
 *.00?:*. 386:*.3GR:*.{??
masks=*.GZ?:*.TD0:*.TGZ:*.??_:*.INF:*.XLSX
excl=*.tmp:*.sql:*.cab:*.jar:?????????:~$*

The following command may be used to assign a file path for the virus checking script:

file_path="./setup/VC"

Itemizing storage servers in step 400 may utilize the following command to determine the storage servers to check or scan for viruses or other malware:

nas_server -l|awk '{print $6}'|grep server>"$file_path"/server.lst

These storage servers may be checked to see whether they are running a CIFS service or other service such as a NFS service using a command:

server_cifs $serv|grep -v "Cifs started">server.lst

As mentioned above, in some embodiments back end virus scanning may be performed for multiple storage arrays, such as storage arrays distributed worldwide by an enterprise. The following command may be used to list storage arrays worldwide:

storage_list="storage.lst"

To determine all storage arrays, the following commands may be used:

while read -r storage
for storage in "$(cat $storage_list)";
do
echo "*****"
echo "$storage"
echo "*****"

A public key for the storage arrays may be copied using the following command:

ssh -n admin@"$storage" "mkdir -vp setup/VC"</dev/null/usr/bin/ssh-copy-id    -I    .ssh/id_rsa.pub admin@$storage The public key may be utilized for accessing the files, file systems or other features of the storage servers to perform virus scanning.

An example of pseudocode which may be utilized to implement a file count command is as follows:

[root]# find. -xdev -type f -print'\n'|wc -1

This file count command will count the number of files on a storage server.

The process illustrated in FIG. 4 then continues with step 402, iterating through the storage servers identified or itemized in step 400. Such an iteration may include, for example a loop using a command:

while read -r server
do
echo "$server"

Iterating through the storage servers includes, in step 404, checking whether a VC agent is configured for a current storage server. Step 404 may utilize a command:

server_setup server_-P viruschk -o start to check whether the VC agent is configured for the current storage server. If the VC agent is not configured for the current storage server, the process logs an error in step 406 then proceeds to step 408 to determine whether there are additional servers to check. If there are no additional servers to check, the process ends in step 424. If there are additional servers to check, the process loops back to step 402 and selects the next storage server.

If it is determined that the VC agent for the current storage server is configured in step 404, the process continues with step 410, enumerating or otherwise identifying the file systems of the current storage server. Step 410 may be performed using commands:

file_list="file_path"/"$server"_fs.lst
and
server_df    "$server"|sort|grep    fs_0|cut    -d"-fl>"$file_path"/"$server"_filesystem.lst The enumerated file systems may be listed using a command:

echo "$fs"

which will return a list of file systems on the current storage server, such as:

fs_0201
fs_0202
fs_0203
. . .
fs_0242
fs_0243

In step 412, the file systems enumerated in step 410 are committed to the VC engines of one or more of the back end AV servers and in step 414 the committed file systems are scanned for viruses or other malware. The following commands may be used to implement steps 412 and 414:

fs_list-"file_path"/"server"_fs.list
while read -r filesystem
echo "$filesystem"
server_viruschk $server -fsscan $fs -create In step 416, it is determined whether an infected file is found during a scan of the committed file system in step 414. If an infected file is found, the process continues with step 418, quarantining or taking other remedial action (e.g., deleting, cleaning, generating a notification or alert, etc.) for the infected file. After quarantining or taking other remedial action in step 418, or if no infected file is found in step 416, a determination is made in step 420 as to whether there are additional files to be checked in the file systems of the current storage server. If there are additional files, the process loops back to steps 414-420. If there are no additional files, the process continues with step 422, writing a log. Writing the log may use the command:

server_viruschk $server -fsscan $fs -list>>"$file_path"/"$server"_fsscan.log

After writing the log for the current storage server in step 422, the process continues to step 408 to check if there are additional servers. If there are additional storage servers to scan, the process loops back to step 402. If not, the process ends in step 424. The logs written in step 422 for the different storage servers may be gathered using the command:

ssh -n admin@$storage<./setup/VC/vc_mk_logs.sh

Logs may be output using a command:

log_list="file_path"/server.lst which, for each server, performs the following commands:

while read -r server
echo "$server"
server_log    $server|grep    VC:    >>"$file_path"/"$server"_VC.log The logs for the storage servers may be archived using a command:

cat *.log|grep "VC:"|grep -i modified|grep -vi deleted|grep -vi Execution|grep -v No|sort -u>Modified.txt The logs may be copied using commands:

Day=$(date+% j)
D=$storage"_"$(date+% j)
echo $D
mkdir $D
scp admin@$storage: ./setup/VC/*.log $D/and archived (e.g., zipped) using a command:

zip -r VC_"$day"_LODS.zip *$day

The control station of a storage array may provide or otherwise make available log files (which may be archived using the above-described commands) to users, such as users of client devices that access the network shares of the storage array. In some embodiments, access to the log files may be restricted to certain types of users, such as network administrators or other personnel of an entity responsible for managing the network share.

It is to be appreciated that the particular advantages described above and elsewhere herein are associated with particular illustrative embodiments and need not be present in other embodiments.

Also, the particular types of information processing system features and functionality as illustrated in the drawings and described above are exemplary only, and numerous alternative arrangements may be used in other embodiments.

The information processing systems disclosed herein are illustratively implemented using one or more processing platforms, examples of which will be now described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally or alternatively comprise other types of virtual resources such as virtual machines implemented using a hypervisor. Such cloud infrastructure can therefore be used to provide what is also referred to herein as a cloud computing environment. A given cloud computing environment may but need not accommodate multiple tenants.

The cloud infrastructure mentioned above may represent at least a portion of one processing platform. Another example of such a processing platform is a plurality of processing devices which communicate with one another over a network. Each such processing device comprises at least one processor coupled to at least one memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment.

Cloud infrastructure as disclosed herein can include cloud-based systems such as an Amazon Web Services (AWS) system. Other examples of cloud-based systems that can be used to implement at least portions of systems 100 and 300 include Google Cloud Platform (GCP) and Microsoft Azure. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux container (LXC). The containers may run on virtual machines in a multi-tenant environment, although other arrangements are possible. The containers may be utilized to implement a variety of different types of functionality within the systems 100 and 300. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of systems 100 and 300, these platforms may also be used to implement at least portions of other information processing systems in other embodiments.

Figure 5:
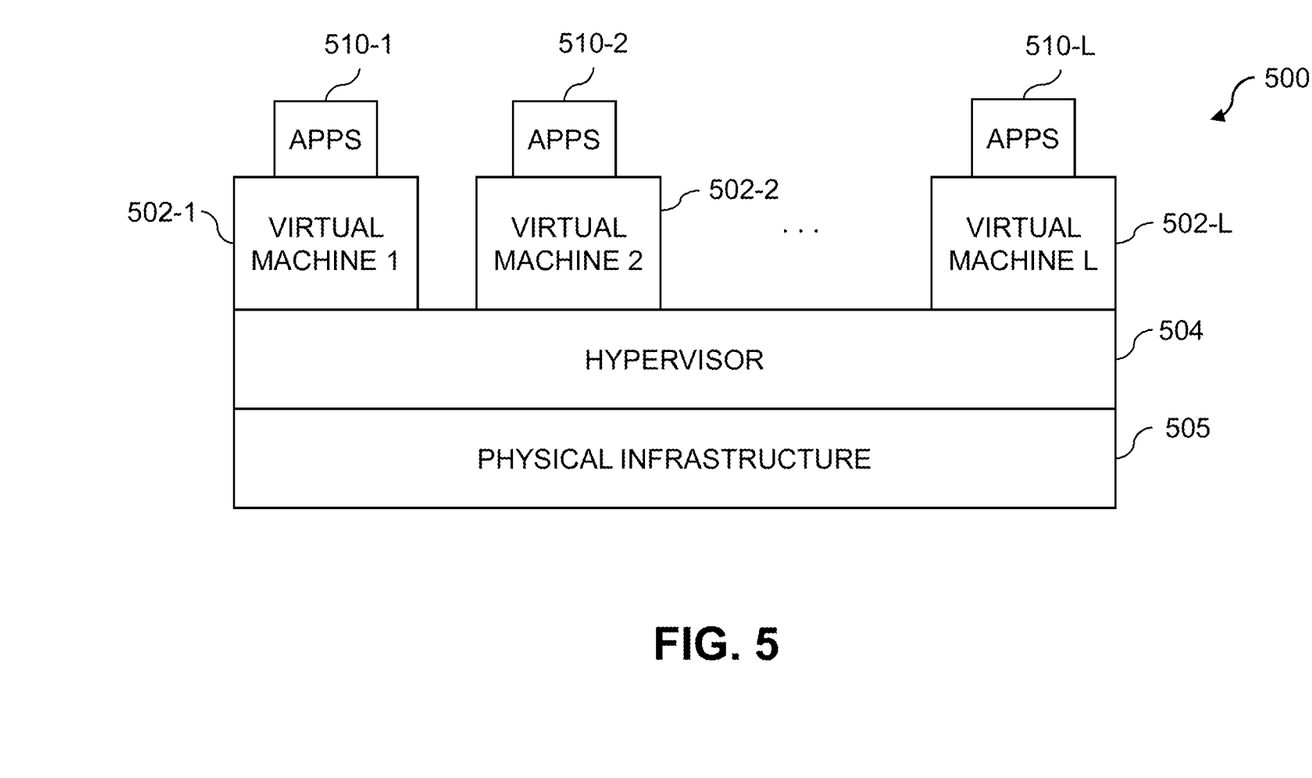
FIGS. 5 and 6 show examples of processing platforms that may be utilized to implement at least a portion of the FIG. 1 or 3 systems.
Figure 6:
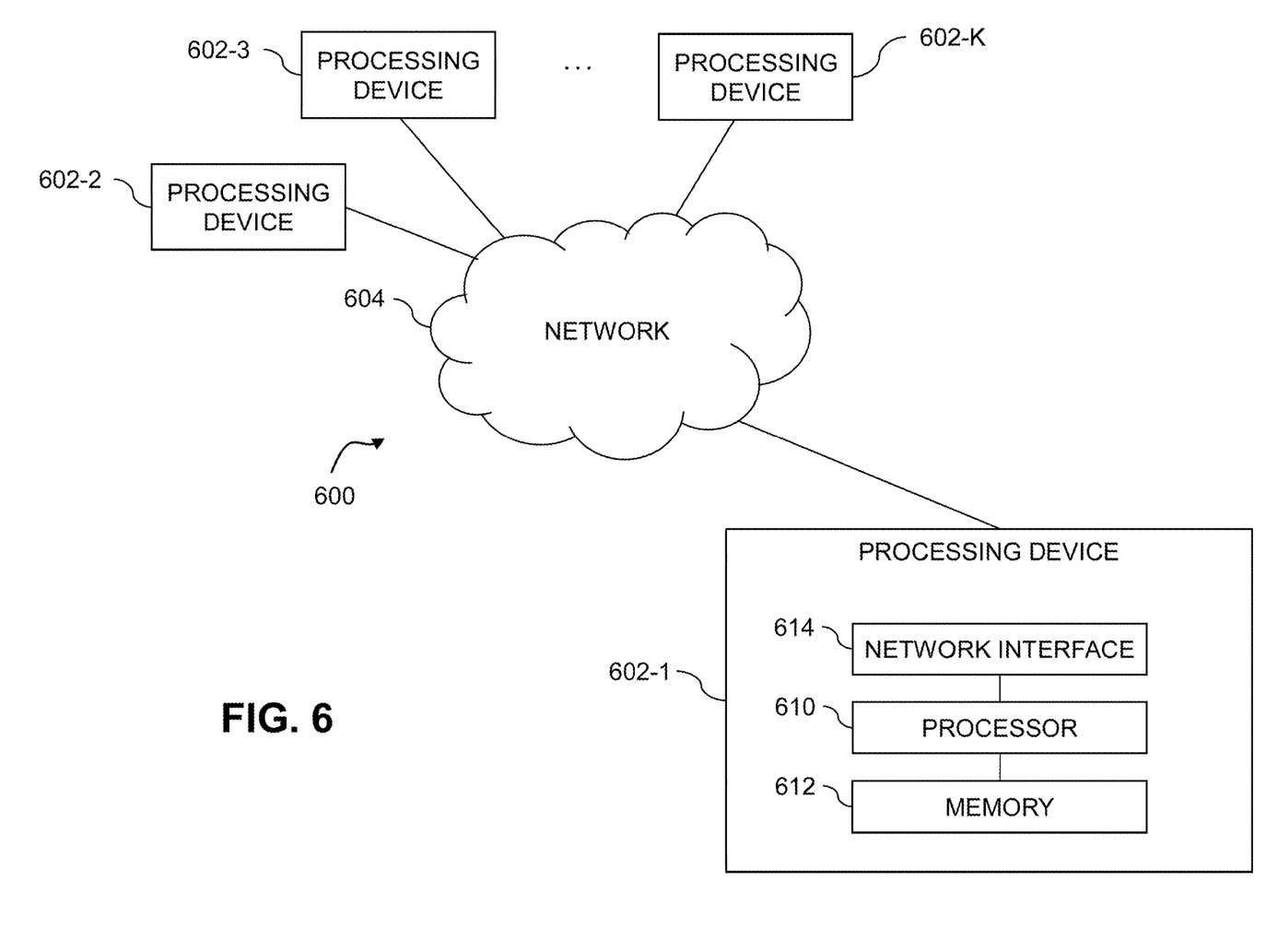

FIG. 5 shows an example processing platform comprising cloud infrastructure 500. The cloud infrastructure 500 comprises a combination of physical and virtual processing resources that may be utilized to implement at least a portion of the information processing system 100 or 300. The cloud infrastructure 500 comprises virtual machines (VMs) 502-1, 502-2, . . . , 502-L implemented using a hypervisor 504. The hypervisor 504 runs on physical infrastructure 505. The cloud infrastructure 500 further comprises sets of applications 510-1, 510-2, . . . , 510-L running on respective ones of the virtual machines 502-1, 502-2, . . . , 502-L under the control of the hypervisor 504.

Although only a single hypervisor 504 is shown in the embodiment of FIG. 5, the system may of course include multiple hypervisors each providing a set of virtual machines using at least one underlying physical machine. Different sets of virtual machines provided by one or more hypervisors may be utilized in configuring multiple instances of various components of the systems 100 or 300.

An example of a hypervisor platform that may be used to implement hypervisor 504 and possibly other portions of the information processing system 100 or 300 in one or more embodiments is the VMware® vSphere® which may have an associated virtual infrastructure management system such as the VMware® vCenter™. The underlying physical machines may comprise one or more distributed processing platforms that include one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

As is apparent from the above, one or more of the processing modules or other components of system 100 or 300 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 or 300 and includes a plurality of processing devices, denoted 602-1, 602-2, 602-3, . . . , 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 or 300 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

These and numerous other alternative cloud computing environments or other types of processing platforms can be configured to implement functionality for classifying software modules as disclosed herein.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing systems 100 or 300. Such components can communicate with other elements of the information processing systems 100 or 300 over any type of network or other communication media.

As indicated previously, components of an information processing system as disclosed herein can be implemented at least in part in the form of one or more software programs stored in memory and executed by a processor of a processing device. For example, at least portions of the functionality described herein for classifying software modules are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems in which it is desirable to provide virus scanning functionality described herein. Also, the particular configurations of system and device elements shown in the figures can be varied in other embodiments. Thus, for example, the particular type of software modules deployed in a given embodiment and their respective configurations may be varied. Other features of the illustrative embodiments can also be varied. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. A storage system comprising:
   at least one processing device comprising a processor coupled to a non-transitory memory having program code stored thereon that when executed by the processor causes the processor to:
   determine two or more storage servers accessible to the storage system; and
   conduct a virus scan by iterating through the two or more storage servers to scan files stored in a plurality of file systems of the two or more storage servers;
   wherein iterating through the two or more storage servers comprises:
   selecting one of the storage servers;
   identifying the file systems provided by the selected storage server;
   committing the identified file systems to a plurality of dedicated antivirus servers coupled to the storage system through one or more dedicated interfaces;
   scanning files in the committed file systems utilizing the plurality of dedicated antivirus servers; and responsive to completing the scan of files in the committed file systems, selecting another one of the storage servers and repeating the identifying, committing and scanning;

wherein the two or more storage servers comprise front end servers having a plurality of client devices in communication therewith through one or more networks;

wherein the dedicated antivirus servers comprise back end antivirus servers;

wherein committing the identified file systems is exclusive to the dedicated antivirus servers through the one or more dedicated interfaces;

wherein scanning the files in the committed file systems utilizing the plurality of dedicated antivirus servers comprises scanning (i) files accessed by the plurality of client devices and (ii) files copied to the committed file systems without access requests by the plurality of client devices; and wherein one or more of the files copied to the committed file systems without access requests by the plurality of client devices comprise files accumulated in the storage servers through one or more of at least one data migration and at least one data consolidation.

2. The storage system of claim 1, further comprising a storage array comprising the at least one processing device and at least one of the two or more storage servers.

3. The storage system of claim 1 wherein scanning files in the committed file systems utilizing the plurality of dedicated antivirus servers comprises accessing files in the committed file systems using one or more dedicated command line interfaces.

4. The storage system of claim 3 wherein a multiprotocol interface is utilized to access files in the committed file systems, the multiprotocol interface comprising a Network File System (NFS) interface and a Common Internet File System (CIFS) interface.

5. The storage system of claim 3 wherein accessing files in the committed file systems comprises utilizing a Secure Shell (SSH) command line interface.

6. The storage system of claim 1 wherein conducting the virus scan is responsive to invoking a script file stored locally in the memory of the at least one processing device.

7. The storage system of claim 6 wherein the script file comprises a configuration of one or more file types to scan in the committed file systems.

8. The storage system of claim 6 wherein the script file comprises a shell script.

9. The storage system of claim 6 wherein conducting the virus scan is performed on-demand by invoking the script file stored locally in the memory of the at least one processing device through at least one of the client devices having access to the at least one processing device and permission to invoke the script file.

10. The storage system of claim 6 wherein conducting the virus scan is performed periodically based on a time-based job scheduler implemented by the at least one processing device that invokes the script file stored locally in the memory of the at least one processing device.

11. The storage system of claim 10 wherein the time-based job scheduler comprises Cron.

12. The storage system of claim 1 wherein scanning the files in the committed file systems comprises, responsive to detecting a malicious file stored in a given one of the file systems, quarantining the malicious file and updating a log to indicate detection of the malicious file.

13. The storage system of claim 12 wherein iterating through the two or more storage servers comprises, responsive to completing the scan of files in the committed file systems of the selected storage server, writing the log to a memory of the at least one processing device.

14. A method comprising:

determining two or more storage servers accessible to a storage system; and conducting a virus scan by iterating through the two or more storage servers to scan files stored in a plurality of file systems of the two or more storage servers;

wherein iterating through the two or more storage servers comprises:

selecting one of the storage servers;

identifying the file systems provided by the selected storage server;

committing the identified file systems to a plurality of dedicated antivirus servers coupled to the storage system through one or more dedicated interfaces;

scanning files in the committed file systems utilizing the plurality of dedicated antivirus servers; and responsive to completing the scan of files in the committed file systems, selecting another one of the storage servers and repeating the identifying, committing and scanning;

wherein the two or more storage servers comprise front end servers having a plurality of client devices in communication therewith through one or more networks;

wherein the dedicated antivirus servers comprise back end antivirus servers;

wherein committing the identified file systems is exclusive to the dedicated antivirus servers through the one or more dedicated interfaces;

wherein scanning the files in the committed file systems utilizing the plurality of dedicated antivirus servers comprises scanning (i) files accessed by the plurality of client devices and (ii) files copied to the committed file systems without access requests by the plurality of client devices;

wherein one or more of the files copied to the committed file systems without access requests by the plurality of client devices comprise files accumulated in the storage servers through one or more of at least one data migration and at least one data consolidation; and wherein the method is implemented using at least one processing device comprising a processor coupled to a memory.

15. The method of claim 14 wherein:

scanning files in the committed file systems utilizing the plurality of dedicated antivirus servers comprises accessing files in the committed file systems using one or more dedicated command line interfaces; and a multiprotocol interface is utilized to access files in the committed file systems, the multiprotocol interface comprising a Network File System (NFS) interface and a Common Internet File System (CIFS) interface.

16. The method of claim 14 wherein conducting the virus scan is responsive to invoking a script file stored locally in the memory of the at least one processing device, and wherein conducting the virus scan is performed at least one of:

on-demand by invoking the script file stored locally in the memory of the at least one processing device through at least one of the client devices having access to the at least one processing device and permission to invoke the script file; and periodically based on a time-based job scheduler implemented by the at least one processing device that invokes the script file stored locally in the memory of the at least one processing device.

17. A computer program product comprising a non-transitory computer-readable storage medium having stored therein program code of one or more software programs, wherein the program code when executed by at least one processing device comprising a processor coupled to a memory causes the at least one processing device:

to determine two or more storage servers accessible to a storage system; and to conduct a virus scan by iterating through the two or more storage servers to scan files stored in a plurality of file systems of the two or more storage servers;

wherein iterating through the two or more storage servers comprises:

selecting one of the storage servers;

identifying the file systems provided by the selected storage server;

committing the identified file systems to a plurality of dedicated antivirus servers coupled to the storage system through one or more dedicated interfaces;

scanning files in the committed file systems utilizing the plurality of dedicated antivirus servers; and responsive to completing the scan of files in the committed file systems, selecting another one of the storage servers and repeating the identifying, committing and scanning;

wherein the two or more storage servers comprise front end servers having a plurality of client devices in communication therewith through one or more networks;

wherein the dedicated antivirus servers comprise back end antivirus servers;

wherein committing the identified file systems is exclusive to the dedicated antivirus servers through the one or more dedicated interfaces;

wherein scanning the files in the committed file systems utilizing the plurality of dedicated antivirus servers comprises scanning (i) files accessed by the plurality of client devices and (ii) files copied to the committed file systems without access requests by the plurality of client devices; and wherein one or more of the files copied to the committed file systems without access requests by the plurality of client devices comprise files accumulated in the storage servers through one or more of at least one data migration and at least one data consolidation.

18. The computer program product of claim 17 wherein:

scanning files in the committed file systems utilizing the plurality of dedicated antivirus servers comprises accessing files in the committed file systems using one or more dedicated command line interfaces; and a multiprotocol interface is utilized to access files in the committed file systems, the multiprotocol interface comprising a Network File System (NFS) interface and a Common Internet File System (CIFS) interface.

19. The computer program product of claim 17 wherein conducting the virus scan is responsive to invoking a script file stored locally in the memory of the at least one processing device, and wherein conducting the virus scan is performed at least one of:

on-demand by invoking the script file stored locally in the memory of the at least one processing device through at least one of the client devices having access to the at least one processing device and permission to invoke the script file; and periodically based on a time-based job scheduler implemented by the at least one processing device that invokes the script file stored locally in the memory of the at least one processing device.

20. The computer program product of claim 17 wherein scanning the files in the committed file systems comprises, responsive to detecting a malicious file stored in a given one of the file systems, quarantining the malicious file and updating a log to indicate detection of the malicious file.

* * * * *